(12) United States Patent  
Kakegawa et al.

(10) Patent No.: US 11,559,761 B2
(45) Date of Patent: Jan. 24, 2023

(54) DUST COLLECTOR

(71) Applicant: Koki Holdings Co., Ltd., Tokyo (JP)

(72) Inventors: Daisuke Kakegawa, Ibaraki (JP); Yoshimasa Hayama, Ibaraki (JP)

(73) Assignee: Koki Holdings Co., Ltd., Tokyo (JP)

(*) Notice: Subject to any disclaimer, the term of this patent is extended or adjusted under 35 U.S.C. 154(b) by 0 days.

(21) Appl. No.: 16/771,690

(22) PCT Filed: Sep. 28, 2018

(86) PCT No.: PCT/JP2018/036311
§ 371 (c)(1),
(2) Date: Jun. 11, 2020

(87) PCT Pub. No.: WO2019/116681
PCT Pub. Date: Jun. 20, 2019

(65) Prior Publication Data
US 2021/0069626 A1 Mar. 11, 2021

(30) Foreign Application Priority Data

Dec. 14, 2017 (JP) .............................. JP2017-240053

(51) Int. Cl.
*B01D 39/00* (2006.01)
*B01D 46/70* (2022.01)
(Continued)

(52) U.S. Cl.
CPC ................ *B01D 46/70* (2022.01); *A47L 9/20* (2013.01); *B01D 46/0049* (2013.01);
(Continued)

(58) Field of Classification Search
CPC ............ B01D 46/0067; B01D 46/0049; B01D 46/24; B01D 46/48; B01D 2273/30;
(Continued)

(56) References Cited

U.S. PATENT DOCUMENTS 5,575,911 A * 11/1996 Rosenberg ............. B01D 46/70
210/411
5,584,900 A * 12/1996 Zaiser .................... B01D 46/24
55/303
(Continued)

FOREIGN PATENT DOCUMENTS

CN 201454297 5/2010
CN 104511215 4/2015
(Continued)

OTHER PUBLICATIONS

Office Action of China Counterpart Application, with English translation thereof, dated May 24, 2021, pp. 1-19.
(Continued)

*Primary Examiner* — Dung H Bui
(74) *Attorney, Agent, or Firm* — JCIPRNET

(57) ABSTRACT

A dust collector (1) is provided with a tank section (10) and a head section (20). The tank section (10) has a dust collection chamber (13) for containing dust. The head section (20) has a motor (23) and a dust collection fan (25). The dust collection chamber (13) has a cylindrical filter device (12) which, when air sucked in from the suction opening (11) flows through the filter device (12), separates dust from the air. A passage member (50) forms an air passage by which the outside air and a filter interior space (14) inside the filter device (12) are connected without having the filter device (12) therebetween. A cover body (60) closes the passage member (50) in an openable manner. The passage member (50) has first opening sections (53) facing the filter interior space (14) and located at different positions in the circumferential direction of the filter device (12).

7 Claims, 4 Drawing Sheets

(51) Int. Cl.
*A47L 9/20* (2006.01)
*B01D 46/00* (2022.01)
*B01D 46/48* (2006.01)
*B01D 46/24* (2006.01)

(52) U.S. Cl.
CPC ............. *B01D 46/24* (2013.01); *B01D 46/48* (2013.01); *B01D 2273/30* (2013.01); *B01D 2279/55* (2013.01)

(58) Field of Classification Search
CPC ... B01D 2279/55; B01D 46/2403; A47L 9/20; A47L 5/365
See application file for complete search history.

(56) References Cited

U.S. PATENT DOCUMENTS

| | | | |
|---|---|---|---|
| 2003/0041729 A1* | 3/2003 | Finigan | B01D 46/04 95/26 |
| 2004/0118276 A1* | 6/2004 | Kim | B01D 46/0032 95/8 |
| 2005/0011036 A1* | 1/2005 | McCutchen | A47L 9/12 15/319 |
| 2008/0060163 A1* | 3/2008 | Tanaka | A47L 9/20 15/352 |
| 2008/0092498 A1 | 4/2008 | Stewen et al. | |
| 2008/0127826 A1* | 6/2008 | Raether | B01D 46/0049 95/280 |
| 2008/0168616 A1* | 7/2008 | Tanaka | A47L 9/20 15/352 |
| 2008/0302070 A1* | 12/2008 | Castronovo | B01D 46/42 55/324 |
| 2009/0193612 A1* | 8/2009 | Weiss | A47L 9/0081 15/347 |
| 2009/0205491 A1* | 8/2009 | Eckstein | B01D 46/0064 95/68 |
| 2010/0122427 A1* | 5/2010 | Ichikawa | A47L 5/365 15/339 |
| 2010/0293743 A1* | 11/2010 | Beskow | A47L 9/20 15/347 |
| 2011/0017236 A1* | 1/2011 | Jonsson | A47L 9/1625 134/21 |
| 2011/0146025 A1* | 6/2011 | Tanimoto | A47L 5/365 15/347 |
| 2011/0220586 A1* | 9/2011 | Levitt | B01D 46/2403 210/791 |
| 2013/0112075 A1* | 5/2013 | Millner | B01D 46/02 95/96 |
| 2013/0199137 A1* | 8/2013 | Hallgren | B04C 5/081 55/393 |
| 2013/0228194 A1* | 9/2013 | Holsten | B01D 46/2411 15/352 |
| 2013/0255030 A1* | 10/2013 | Meredith | A47L 7/0004 15/347 |
| 2014/0237763 A1* | 8/2014 | Holsten | A47L 9/20 96/417 |
| 2014/0366493 A1* | 12/2014 | Takahashi | B01D 46/681 210/411 |
| 2017/0080373 A1* | 3/2017 | Engelhard | B01D 46/448 |
| 2017/0122270 A1* | 5/2017 | Williams | B01D 46/521 |
| 2017/0151512 A1* | 6/2017 | Takahashi | B01D 29/68 |
| 2017/0151524 A1* | 6/2017 | King | B01D 46/2411 |
| 2017/0173501 A1* | 6/2017 | Li | B01D 29/15 |
| 2017/0239605 A1* | 8/2017 | Jansen | B01D 46/71 |
| 2018/0199794 A1* | 7/2018 | Nemetz | B23Q 11/0071 |
| 2018/0235419 A1* | 8/2018 | Tahara | A47L 9/122 |
| 2019/0009281 A1* | 1/2019 | Kraxner | B01D 46/24 |
| 2019/0134649 A1* | 5/2019 | Witter | B04C 9/00 |
| 2019/0255476 A1* | 8/2019 | Silvestro | B01D 46/48 |
| 2019/0350422 A1* | 11/2019 | Liu | A47L 9/20 |
| 2019/0374882 A1* | 12/2019 | Wetter | B01D 46/0015 |
| 2021/0113950 A1* | 4/2021 | Satake | B01D 46/71 |
| 2021/0113951 A1* | 4/2021 | Oh | B01D 46/2403 |

FOREIGN PATENT DOCUMENTS

| | | | | |
|---|---|---|---|---|
| DE | 2450751 | | 3/1976 | |
| DE | 69706664 | | 2/2002 | |
| DE | 102014110940 | | 2/2016 | |
| DE | 102014117085 | | 5/2016 | |
| DE | 102015108558 | | 12/2016 | |
| DE | 102016101414 | | 7/2017 | |
| JP | S49097569 | | 8/1974 | |
| JP | H01106915 | | 4/1989 | |
| JP | H04341314 | | 11/1992 | |
| JP | 2000507876 | | 6/2000 | |
| JP | 2000254428 | | 9/2000 | |
| JP | 2007190303 | | 8/2007 | |
| JP | 2008173329 | | 7/2008 | |
| JP | 2008296020 | | 12/2008 | |
| JP | 2008296020 A | * | 12/2008 | ............... A47L 9/20 |
| JP | 2010042045 | | 2/2010 | |
| JP | 2014504528 | | 2/2014 | |
| JP | 2016034484 A | * | 3/2016 | ............... A47L 9/20 |
| JP | 2016203070 A | * | 12/2016 | ............ B01D 24/48 |

OTHER PUBLICATIONS

"International Search Report (Form PCT/ISA/210) of PCT/JP2018/036311", dated Jan. 8, 2019, with English translation thereof, pp. 1-2.
"Office Action of German Counterpart Application", dated Feb. 18, 2022, with English translation thereof, p. 1-p. 17.
"Office Action of Japan Counterpart Application", dated Nov. 30, 2021, with English translation thereof, p. 1-p. 8.

* cited by examiner

DUST COLLECTOR

CROSS-REFERENCE TO RELATED APPLICATION

This application is a 371 application of the International PCT application serial no. PCT/JP2018/036311, filed on Sep. 28, 2018, which claims the priority benefits of Japan Patent Application No. 2017-240053, filed on Dec. 14, 2017. The entirety of each of the above-mentioned patent applications is hereby incorporated by reference herein and made a part of this specification.

BACKGROUND OF THE INVENTION

Technical Field

The present invention relates to a dust collector that collects dust.

Related Art

Among dust collectors, there is a dust collector including a dust removing mechanism that removes dust attached to a filter in order to extend the service life of the filter.

LITERATURE OF RELATED ART

Patent Literature

Patent Literature 1: Japanese Patent Laid-Open No. 2007-190303

SUMMARY

Problems to be Solved

A dust removing mechanism in a dust collector of Patent Literature 1 drives a dust remover by a dust removing motor so as to beat off dust attached to the filter by beating (vibration). However, means for detecting clogging of the filter, the dust removing motor, the dust remover, and the like are required, and thus problems arise in that the number of configurational parts increases and the configuration becomes complicated.

The present invention is made in recognition of the above circumstances, and an object thereof is to provide a dust collector capable of removing dust on a filter with a simple configuration.

Means to Solve Problems

According to an aspect of the present invention, a dust collector is provided. The dust collector includes: a dust collection chamber that communicates with a suction opening and accommodates dust; a main body that has a motor and a dust collection fan which is driven by the motor; a filter device that is cylindrical and arranged in the dust collection chamber, wherein the filter device separates dust from air sucked in from the suction opening when the air flows through the filter device; a passage member that forms an air passage by which outside air and a filter interior space inside the filter device are communicated with each other without having the filter device therebetween; and a closing portion that closes the passage member in an opening/closing openable manner. The passage member has a plurality of first opening portions facing the filter interior space and located at different positions in a circumferential direction of the filter device.

Among the plurality of first opening portions, a first opening portion having a long air guide distance from an outside-air inlet of the passage member may have a larger opening area than that of a first opening portion having a close air guide distance.

According to another aspect of the present invention, a dust collector is provided. The dust collector includes: a dust collection chamber that communicates with a suction opening and accommodates dust; a main body that has a motor and a dust collection fan which is driven by the motor; a filter device that is cylindrical and arranged in the dust collection chamber, wherein the filter device separates dust from air sucked in from the suction opening when the air flows through the filter device; a passage member that forms an air passage by which outside air and a filter interior space inside the filter device are communicated with each other without having the filter device therebetween; and a closing portion that closes the passage member in an opening/closing openable manner. The passage member has first opening portions facing the filter interior space. The first opening portions allow a space inside the passage member and a space inside the filter device to communicate with each other at positions separated by 90 degrees or larger from each other in a circumferential direction of the filter device.

The passage member may have a first duct portion which extends in a circumferential direction of the filter, and the first opening portions may be arranged at the first duct portion.

The passage member may have a second duct portion with one end coupled to the first duct portion, and the second duct portion may have, at the other end, a second opening portion being open toward a side of the outside air.

The dust collector may include an operation portion that switches between opening and closing of the passage member by the closing portion.

The dust collector may include a blocking member that blocks the suction opening when the closing portion closes the passage member.

The dust collector may include a tank portion that has the dust collection chamber therein, and the main body may be a head portion connected to an upper side of the tank portion.

Moreover, an optional combination of configurational elements described above or an example in which there is a change in description of the present invention in a method, a system, and the like is also valid as an aspect of the present invention.

Effect

According to the present invention, it is possible to provide a dust collector capable of removing dust on a filter with a simple configuration.

DESCRIPTION OF THE EMBODIMENTS

Figure 1:
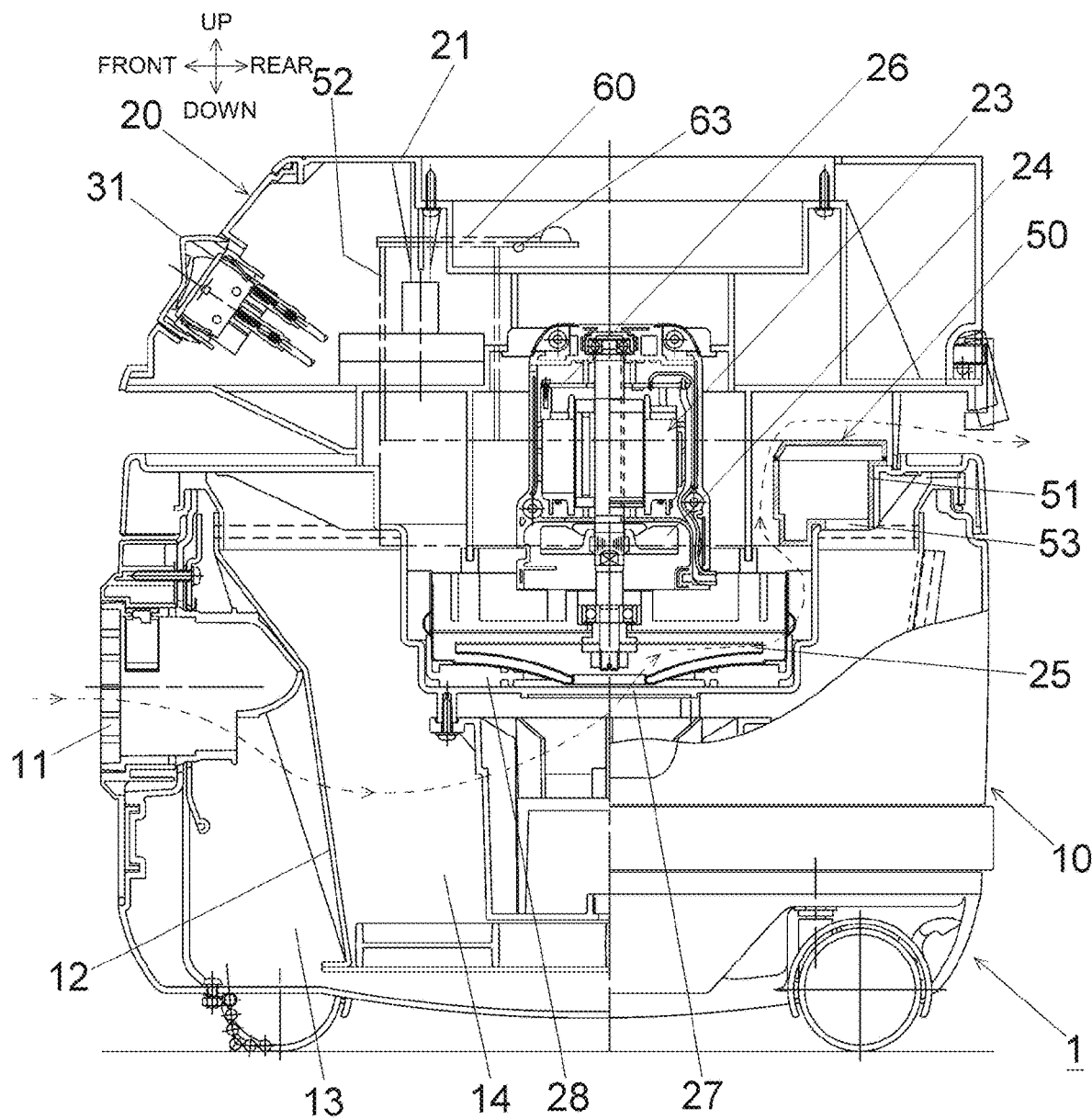
FIG. 1 is a cross-sectional right-side view of a dust collector 1 according to an embodiment of the present invention.

Hereinafter, preferred embodiments of the present invention are described in detail with reference to the drawings. Moreover, the same reference signs are assigned to the same or equivalent configurational elements, members, and the like illustrated in the drawings, and the repeated description thereof is appropriately omitted. In addition, the invention is not limited to the embodiments, and the embodiments are provided as examples of the invention. Characteristics or combinations thereof which are described in the embodiments are not all necessarily essential to the invention.

Front-rear and up-down directions which are orthogonal to each other in the dust collector (electrical dust collector) 1 are defined as illustrated in FIG. 1. Dashed-line arrows in FIG. 1 represent flowing of the air flow generated by a dust collection fan 25. A dust collector 1 includes a tank portion 10 and a head portion 20 serving as a main body. The tank portion 10 and the head portion 20 can be separated from each other.

Figure 3:
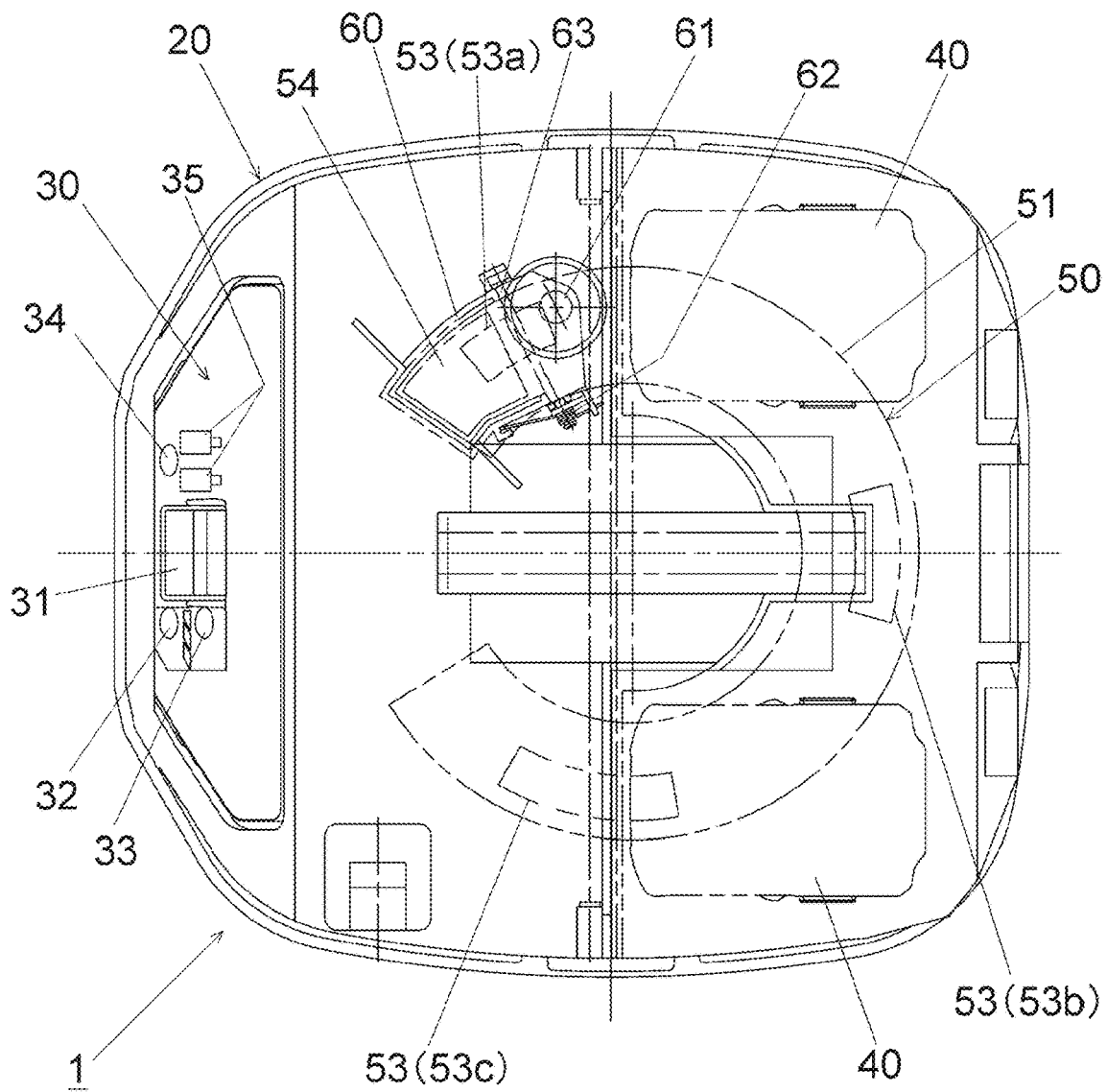
FIG. 3 is a plan view of the dust collector 1.

The tank portion 10 has a bottomed cylindrical shape in which an upper portion is open, and a horizontal cross section of the tank portion has a substantially quadrangular shape (rounded square or rectangular shape in the example illustrated in the drawing) as illustrated in FIG. 3. The tank portion 10 has a suction opening 11 in a side surface on a front side, and a hose (not illustrated) can be detachably connected to the suction opening 11. In the tank portion 10, a filter device 12 being cylindrical is arranged which separates dust (powdery dust) from air sucked in from the suction opening 11 when the air flows through the filter device 12 (that is, the filter device 12 filters out sucked dust). The filter device 12 has a substantially side surface shape of a truncated cone having an axis substantially parallel to the up-down direction. An outer circumferential surface of the filter device 12 has a filter shape which is formed of cloth or the like having fine mesh, and air can enter a filter interior space 14 inside the filter device 12 by passing through the outer circumferential surface. However, dust accommodated in the air cannot pass through the mesh and is filtered out on the outer circumferential surface of the filter device 12 and attached to the outer circumferential surface of the filter device 12 or falls downward. A space in the tank portion 10 is a dust collection chamber 13, and dust separated by the filter device 12 is accommodated in a space of the dust collection chamber 13 outside the filter device 12. The filter interior space 14 is a space inside the filter device 12 in the tank portion 10 and a space outside a fan cover 27.

The head portion 20 is detachably fixed to an upper part of the tank portion 10 by, for example a clamping mechanism not illustrated. The head portion 20 includes a motor 23, a motor cooling fan 24, and the dust collection fan 25 inside a head housing 21. The fan cover 27 that configures a part of the head housing 21 enters the inside of the tank portion 10 and separates the filter interior space 14 from a fan chamber 28 that accommodates the dust collection fan 25. The fan cover 27 has a substantially cylindrical shape coaxial with the filter device 12 and projects downward (side of the tank portion 10 when viewed from the head portion 20) so as to enter the inside of the filter device 12 from an upper side of the filter device 12. Hence, the filter interior space 14 formed by an outer circumference of the fan cover 27 and an inner circumference of the filter device 12 is formed into a ring shape within a range in which the filter interior space 14 overlaps the fan cover 27 in a central axis direction of the fan cover 27.

The motor 23 is disposed in the head portion 20 such that an output shaft 23A of the motor extends in the up-down direction. The motor 23 here is a brushless motor, and a switching-element substrate 26, on which a switching element for supplying a drive current to the motor 23 is mounted, is arranged at an upper portion of the motor 23 to be substantially perpendicular to the up-down direction. The motor cooling fan 24 and the dust collection fan 25 are attached to the output shaft 23A of the motor 23 and are rotationally driven by the motor 23. The motor cooling fan 24 is an axial fan positioned immediately below the motor 23 and generates a downward air flow. The dust collection fan 25 is a centrifugal fan arranged below the motor cooling fan 24.

As illustrated in FIG. 3, at a front surface of the head portion 20, an operation panel 30 for a user to switch an operation of the dust collector 1 is arranged. The operation panel 30 has a main power-supply switch 31, an intensity selector switch 32, a single-acting/interlocking selector switch 33, a battery-level display switch 34, and a battery-level display portion 35. Moreover, single acting means a mode in which the dust collector 1 operates as a single body, and interlocking means a mode (function) in which another electrical tool such as a circular saw (not illustrated) is connected to the dust collector 1 via a power cable so as to enable power supply, and the dust collector 1 is driven when the power supply to the electrical tool is detected, that is, when the electrical tool is driven. As illustrated in FIG. 3, the dust collector 1 is a cordless dust collector using two detachably installed battery packs 40 as a power source. When the battery-level display switch 34 is pushed, a remaining level of each battery pack 40 is displayed in multiple levels by LEDs or the like on the battery-level display portion 35.

When the motor 23 is driven in the dust collector 1, the motor cooling fan 24 and the dust collection fan 25 are rotationally driven. Due to the rotation of the dust collection fan 25, a pressure in the tank portion 10 becomes a negative pressure and a suction force is generated at the suction opening 11. In this manner, as illustrated by a dashed-line arrow in FIG. 1, dust is sucked with air from the suction opening 11 into the tank portion 10. Then, the dust is separated from the air by the filter device 12 and gathered in the space of the dust collection chamber 13 outside the filter device 12. On the other hand, the air enters the filter interior space 14 through the outer circumferential surface of the filter device 12, enters the fan chamber 28 from an opening portion (not illustrated) of an under surface of the fan cover 27, and passes through a space separated from the motor 23 to be exhausted to the outside. The dust is collected on the outer circumferential surface of the filter device 12 so as to be gathered in the dust collection chamber 13; however, a part of the dust is attached to the outer circumferential surface of the filter device 12 and causes degradation of suction efficiency or clogging. Hereinafter, a dust removing mechanism that removes the dust attached to the outer circumferential surface of the filter device 12 is described.

The dust removing mechanism has a passage member 50 and a cover body 60. The passage member 50 is a member that forms an air passage (air guide passage) by which the filter interior space 14 and the outside air are communicated with each other without having the filter device 12 therebetween, and the passage member is arranged in the head portion 20. The passage member 50 is a separate body from the head housing 21 and is detachably attached particularly to the fan cover 27 of the head housing 21. Moreover, the passage member 50 may be a molded body integrated with the head housing 21. The cover body 60 forms a closing portion that closes the passage member 50 in an opening/closing openable manner.

The passage member 50 is, for example, a resin molded body and has a first duct portion 51 and a second duct portion 52. The first duct portion 51 extends in the circumferential direction (direction around an axis parallel to the up-down direction) of the filter device 12 and forms an air passage having, for example, a substantially arc shape coaxial with a central axis of the filter device 12. The first duct portion 51 may have a full circle shape in the circumferential direction of the filter device 12. The first duct portion 51 has a plurality of first opening portions 53 at an under surface thereof. The plurality of first opening portions 53 are arranged at positions different from each other in the circumferential direction of the filter device 12 (arranged at intervals of about 120 degrees (substantially equal intervals) in an example illustrated in the drawing), and the first opening portions face the filter interior space 14. One end (lower end) of the second duct portion 52 is connected to the first duct portion 51, and the second duct portion extends in the up-down direction and has, at the other end (upper end), a second opening portion 54 open toward a side of the outside air.

Figure 7:
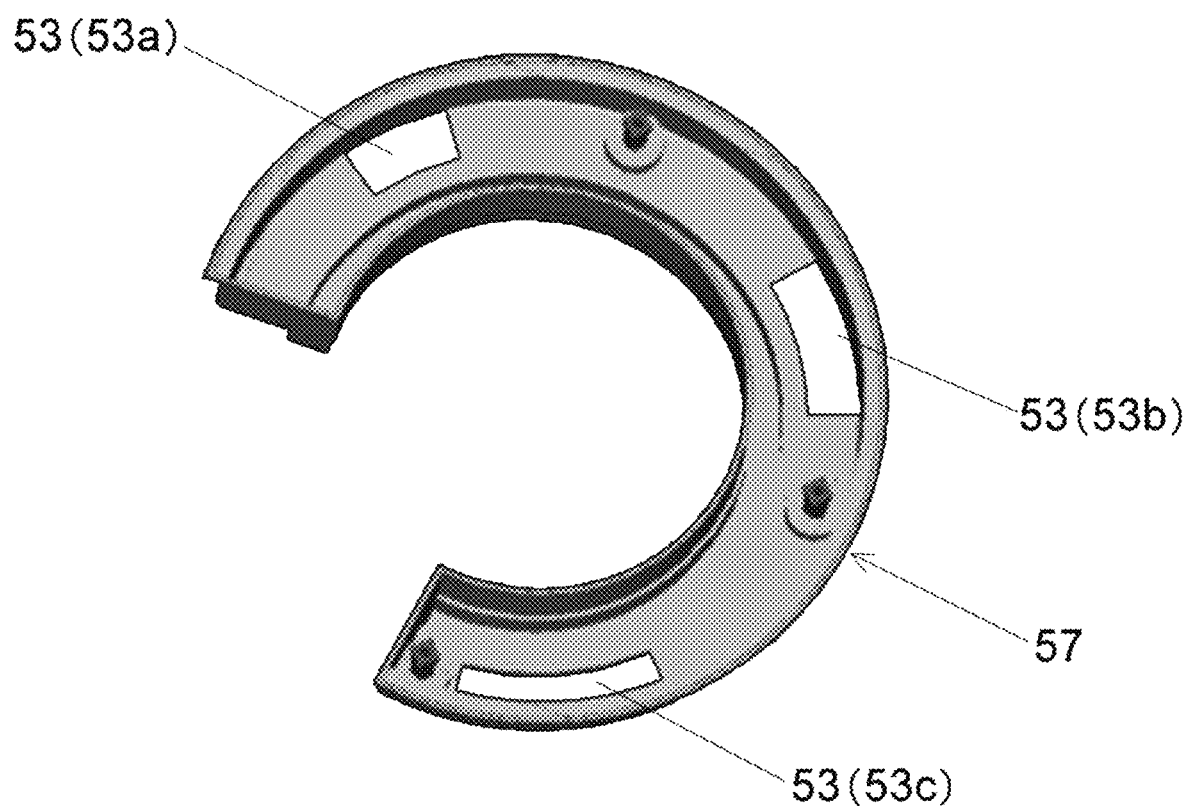
FIG. 7 is a perspective view of a lower passage member 57 of the passage member 50.

The plurality of first opening portions 53 has an opening area which increases as an air guide distance increases from an outside-air inlet (second opening portion 54) of the passage member 50. In FIGS. 3 and 7, the plurality of first opening portions 53 are distinguished to have reference signs 53a, 53b, and 53c from the first opening portion having a close air guide distance in order. The first opening portion 53c has an opening area larger than that of the first opening portion 53b, and the first opening portion 53b has an opening area larger than that of the first opening portion 53a. This is a result of considering that, if the first opening portions have the same opening area, a flow rate of the air decreases as the air guide distance increases. Hence, the opening area increases as the air guide distance of the first opening portion 53 increases, and thereby the air through all of the first opening portions 53 flows at as equal a flow rate as possible.

Here, the passage member 50 has an upper-lower splitting structure and is formed by combining (for example, integrating by screwing) an upper passage member 56 and a lower passage member 57. The upper passage member 56 forms the second duct portion 52 and an upper part of the first duct portion 51. The lower passage member 57 forms a lower part of the first duct portion 51. The first opening portions 53 are arranged on an under surface of the lower passage member 57.

Figure 4:
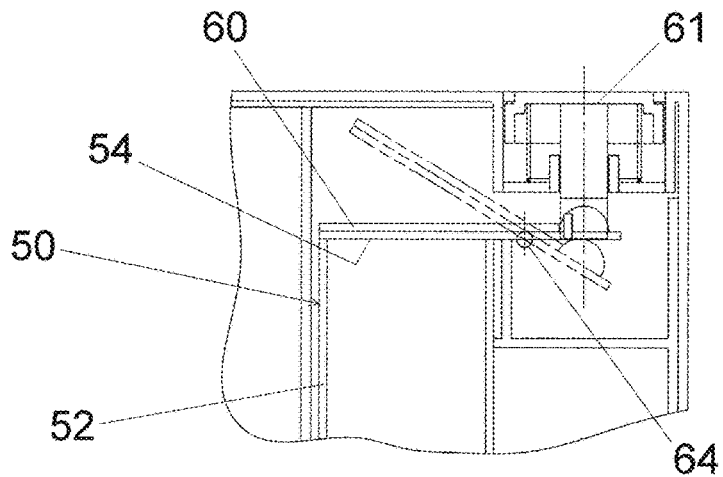
FIG. 4 is a cross-sectional view of main parts and illustrates an operation of a cover body 60 that opens and closes a passage member 50 of the dust collector 1.
Figure 5:
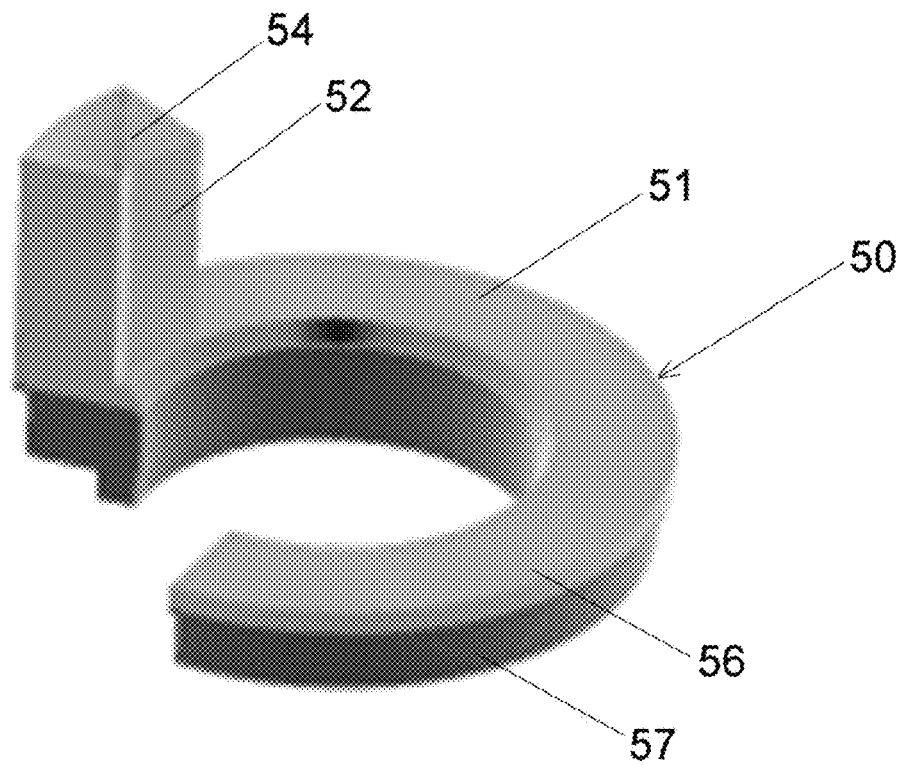
FIG. 5 is a perspective view of the passage member 50.
Figure 6:
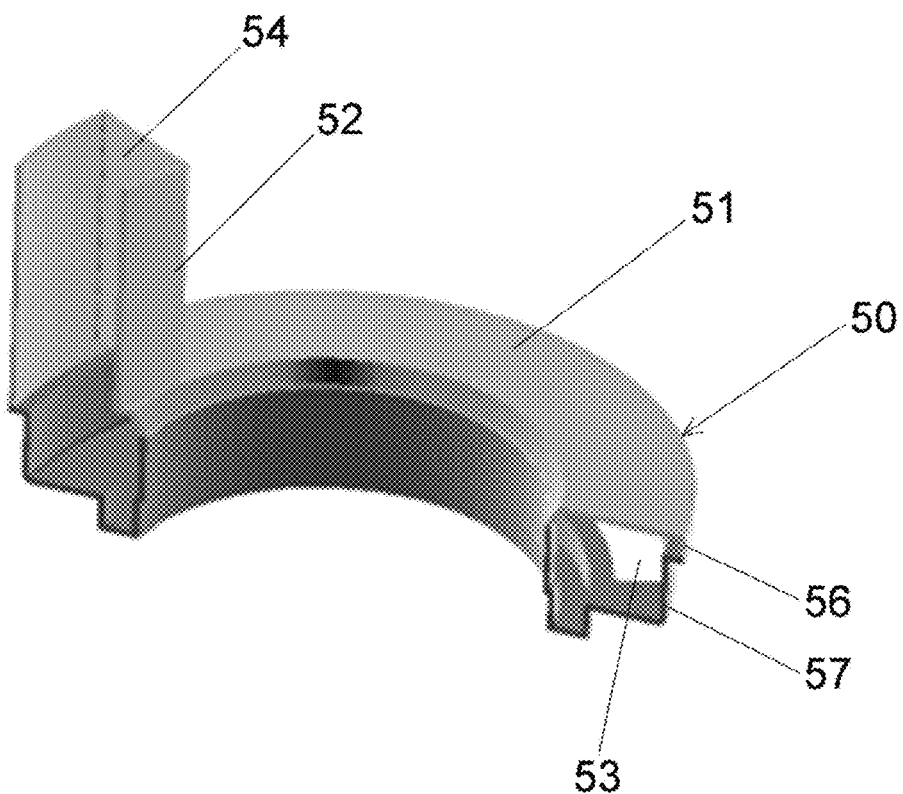
FIG. 6 is a perspective view in which a part of the passage member 50 has a cross section.

The cover body 60 is coupled to an upper end part of the second duct portion 52 via a swinging shaft (rotating shaft) 63 and swings up and down with respect to the swinging shaft 63 to thereby open and close the second opening portion 54. A torsion spring 62 serving as biasing means biases the cover body 60 downward (in a counterclockwise direction in FIG. 4), that is, in a direction in which the second opening portion 54 is closed. An opening/closing operation portion 61 is an operation portion for a user to open the cover body 60 (cause the cover body 60 to swing so as to open the second opening portion 54). The user pushes the opening/closing operation portion 61 downward from above in accordance with an instruction of a push button, and thereby it is possible to cause the cover body 60 to swing upward (rotate in a clockwise direction in FIG. 4) as illustrated by two-dot chain lines in FIG. 4 so as to open the second opening portion 54.

Figure 2:
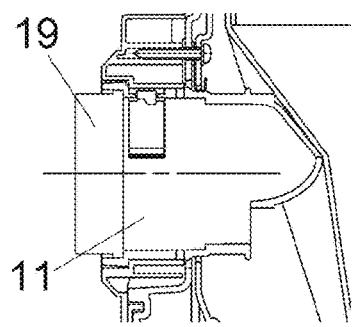
FIG. 2 is a cross-sectional right-side view of main parts and illustrates a state in which a suction opening 11 of the dust collector 1 is closed by a blocking member 19.

When the dust removing mechanism removes dust, the user blocks the suction opening 11 by hand (or blocks the suction opening with a blocking member 19 made of rubber or the like as illustrated in FIG. 2) and starts the dust collector 1 by an operation on the operation panel 30 (operates the dust collection fan 25 by driving the motor 23), in a state that the cover body 60 closes the second opening portion 54. Accordingly, air does not flow in from the suction opening 11, and thus the inside of the tank portion 10 is in a pressure reduction state. The user operates the opening/closing operation portion 61 to open the cover body 60 in a state that the pressure inside the tank portion 10 is reduced. Accordingly, air flows in from the second opening portion 54, and the inflow air (dust removing air flow) is guided (guided to flow) by the passage member 50 to be swiftly ejected from the first opening portions 53 to the filter interior space 14 without passing through the fan chamber 28, and the air is swiftly released from the inside to the outside of the filter device 12. Consequently, the dust attached to the outer circumferential surface of the filter device 12 can be removed.

In the above-described dust removing mechanism, when only one first opening portion 53 is arranged, the dust removing air flow is gathered at a part of a side surface of the filter device 12, the part being positioned in the vicinity of the first opening portion 53, and problems arise in that the dust in positions other than the above part is likely to be insufficiently removed (dust is likely to be unevenly removed) and dust removing efficiency deteriorates. In this respect, in the embodiment, a plurality of first opening portions 53 is arranged at positions different from each other in the circumferential direction of the filter device 12. Hence, it is possible to disperse the dust removing air flow in a wide range on the side surface of the filter device 12, and it is possible to enhance uniformity of dust removal so as to improve the dust removing efficiency.

According to the embodiment, the following effects can be achieved.

(1) The dust removing air flow is emitted into the filter interior space 14 from the plurality of first opening portions 53 arranged at positions different from each other in the circumferential direction of the filter device 12. Therefore, compared with a case that only one first opening portion 53 is arranged, it is possible to cause the dust removing air flow to uniformly reach the side surface of the filter device 12, the dust is uniformly removed from the filter device 12, and thus it is possible to enhance the dust removing efficiency.

(2) Because the opening area increases as the air guide distance of the first opening portion 53 from the second opening portion 54 increases, it is possible to reduce a difference in flow rate of the dust removing air flow which is blown out from the first opening portions 53, and it is possible to enhance uniformity of dust removal so as to improve the dust removing efficiency, as compared with a case that all of the first opening portions 53 have the same opening area.

(3) The user can open the cover body 60 by merely pushing the opening/closing operation portion 61 and can close the cover body 60 due to the bias of the torsion spring 62 by merely taking the hand off the opening/closing operation portion 61, and good dust removing workability is achieved.

(4) If the blocking member 19 is arranged to block the suction opening 11 during dust removing, there is no need to hold the suction opening 11 in the dust removing work (hand can be taken off the suction opening 11), and thus good dust removing workability is achieved.

(5) A simple configuration is provided in which the cover body 60 is opened and the dust removing air flow is emitted to the filter interior space 14 by the passage member 50, and there is no need to arrange means for detecting clogging of the filter device 12, a dust removing motor, a dust remover, or the like so that the number of configurational parts is reduced.

As described above, the present invention is described with the embodiments as examples; however, those skilled in the art understand that it is possible to perform various modifications on every configurational element or every processing process of the embodiments within a range of the claims. Hereinafter, modification examples will be described.

Three first opening portions 53 are arranged in the embodiment; however, two or four or more first opening portions may be arranged. In any cases, the first opening portions 53 are arranged at equiangular intervals in the circumferential direction of the filter device 12, and thereby it is possible to further enhance the uniformity of dust removing.

As long as the first opening portion 53 has a length at an angle of 90 degrees or larger in the circumferential direction of the filter device 12, there may be only one first opening portion. In this case, a certain effect of uniform dust removing is also obtained. The effect of uniform dust removing enhances as the length of the first opening portion 53 increases, and thus it is possible to enhance the effect of uniform dust removing by increasing the length to 120 degrees or larger, 180 degrees or larger, or 270 degrees or larger. In addition, in the first opening portion 53, the width may increases in a part having a longer air guide distance from the second opening portion 54, and the increase in width is also effective to uniform dust removing.

A configuration is employed in which a user can freely attach and detach the blocking member 19 by fitting the blocking member 19 into the suction opening 11, and thereby it is possible to achieve an effect of simplifying the configuration and reducing the possibility of malfunction and the like. However, a configuration may also be employed in which the blocking member 19 blocks the suction opening 11 in conjunction with an operation of the opening/closing operation portion 61 that opens the cover body 60. In this case, it is possible to reduce a work procedure of the user and to easily remove the dust from the filter device 12. As a mechanism that interlocks the opening/closing operation portion 61 and the blocking member 19 to each other, a mechanical link mechanism that links the blocking member 19 to the opening/closing operation portion 61, the cover body 60, or the like may be used, or an electrical mechanism which has a switch or the like that is switched on by the operation of the opening/closing operation portion 61 and in which a motor or the like is driven in response to a signal from the switch to move the blocking member 19 may be used.

What is claimed is:

1. A dust collector, comprising:
a dust collection chamber that communicates with a suction opening and accommodates dust;
a main body that has a motor and a dust collection fan which is driven by the motor;
a filter device that is cylindrical and arranged in the dust collection chamber, wherein the filter device separates dust from air sucked in from the suction opening when the air flows through the filter device;
a passage member that forms an air passage by which outside air and a filter interior space inside the filter device are communicated with each other without having the filter device therebetween; and
a closing portion that closes the passage member in an opening/closing openable manner,
wherein the passage member has a plurality of first opening portions facing the filter interior space and located at different positions in a circumferential direction of the filter device,
wherein, among the plurality of first opening portions, a first opening portion having a long air guide distance from an outside-air inlet of the passage member has a larger opening area than that of a first opening portion having a close air guide distance.

2. A dust collector, comprising:
a dust collection chamber that communicates with a suction opening and accommodates dust;
a tank portion that has the dust collection chamber inside;
a main body detachably fixed to the tank portion that has a motor and a dust collection fan which is driven by the motor;
a filter device that is cylindrical and arranged in the dust collection chamber, wherein the filter device separates dust from air sucked in from the suction opening when the air flows through the filter device;
a passage member disposed on the main body, that forms an air passage by which outside air and a filter interior space inside the filter device are communicated with each other without having the filter device therebetween; and
a closing portion that closes the passage member in an opening/closing openable manner,
wherein the passage member has first opening portions facing the filter interior space, and the first opening portions arranged at positions separated by 90 degrees or larger from each other in a circumferential direction of the filter device allow a space inside the passage member and the filter interior space to communicate with each other
a first duct portion having an arc shape or full circle shape which extends in a circumferential direction of the filter device;
a second duct portion with one end connected to the first duct portion, and the second duct portion has, at the other end, a second opening portion being open toward a side of the outside air;
wherein the first opening portions are arranged at the first duct portion.

3. The dust collector according to claim 2, comprising an operation portion that switches between opening and closing of the passage member by the closing portion.

4. The dust collector according to claim 2, comprising a blocking member that blocks the suction opening when the closing portion closes the passage member.

5. The dust collector according to claim 2, comprising a tank portion that has the dust collection chamber therein, wherein the main body is a head portion connected to an upper side of the tank portion.

6. A dust collector, comprising:
a dust collection chamber that communicates with a suction opening and accommodates dust;
a motor that has an output shaft which extends in an up-down direction;
a dust collection fan that is driven by the motor;
a tank portion that has the dust collection chamber inside;
a main body detachably fixed to the tank portion that has the motor and the dust collection fan;
a filter device wherein the filter device separates dust from air sucked in from the suction opening when the air flows through the filter device;
a passage member disposed on the main body, that forms an air passage by which outside air and a filter interior space into which air enters by passing the filter device are communicated with each other without having the filter device therebetween; and
a closing portion that closes the passage member in an opening/closing openable manner,
wherein the passage member has a plurality of first opening portions facing the filter interior space and located at different positions in a direction around an axis parallel to the up-down direction
a first duct portion having an arc shape or full circle shape which extends in a circumferential direction of the axis;
a second duct portion with one end connected to the first duct portion, and the second duct portion has, at the other end, a second opening portion being open toward a side of the outside air;
wherein the first opening portions are arranged at the first duct portion.

7. A dust collector, comprising:
a dust collection chamber that communicates with a suction opening and accommodates dust;
a motor that has an output shaft which extends in an up-down direction;
a dust collection fan that is driven by the motor;
a tank portion that has the dust collection chamber inside;
a main body detachably fixed to the tank portion that has the motor and the dust collection fan;
a filter device wherein the filter device separates dust from air sucked in from the suction opening when the air flows through the filter device;
a passage member disposed on the main body, that forms an air passage by which outside air and a filter interior space inside the filter device are communicated with each other without having the filter device therebetween; and
a closing portion that closes the passage member in an opening/closing openable manner,
wherein the passage member has first opening portions facing the filter interior space, and the first opening portions arranged at positions separated by 90 degrees or larger from each other in a direction around an axis parallel to the up-down direction allow a space inside the passage member and the filter interior space to communicate with each other
a first duct portion having an arc shape or full circle shape which extends in a circumferential direction of the axis;
a second duct portion with one end connected to the first duct portion, and the second duct portion has, at the other end, a second opening portion being open toward a side of the outside air;
wherein the first opening portions are arranged at the first duct portion.

* * * * *